United States Patent [19]

Nagano et al.

[11] Patent Number: 5,125,173
[45] Date of Patent: Jun. 30, 1992

[54] CYCLING SHOE

[75] Inventors: Masashi Nagano; Shinpei Okajima, both of Osaka, Japan

[73] Assignee: Shimano Industrial Co., Ltd., Osaka, Japan

[21] Appl. No.: 586,523

[22] Filed: Sep. 21, 1990

[30] Foreign Application Priority Data

Jan. 16, 1990 [JP] Japan ..................... 2-7522
Feb. 23, 1990 [JP] Japan ..................... 2-43502
Mar. 2, 1990 [JP] Japan ..................... 2-52437

[51] Int. Cl.⁵ ............... A43B 5/00; A43B 5/14
[52] U.S. Cl. .......................... 36/131; 74/594.6
[58] Field of Search ................ 36/131; 74/594.6

[56] References Cited

U.S. PATENT DOCUMENTS

| | | | |
|---|---|---|---|
| 1,831,851 | 11/1931 | Everett | 36/127 |
| 2,528,951 | 11/1950 | Epsztejn | 36/15 |
| 3,552,041 | 1/1971 | Batchelder et al. | 36/43 |
| 3,987,510 | 10/1976 | Sbicca | 12/142 EV |
| 4,010,558 | 3/1977 | Slusher | 36/127 |
| 4,055,005 | 10/1977 | Meinhart | 136/135 |
| 4,222,182 | 9/1980 | Sears | 36/44 |
| 4,377,952 | 3/1983 | Gamondes | 36/131 |
| 4,506,463 | 3/1985 | Chassaing | 36/131 |
| 4,509,510 | 4/1985 | Hook | 128/252 |
| 4,570,363 | 2/1986 | Annovi | 36/117 |
| 4,596,163 | 6/1986 | Bon | 36/131 |
| 4,685,224 | 8/1987 | Anger | 36/43 |
| 4,783,911 | 11/1988 | Brown | 36/115 |
| 4,893,420 | 1/1990 | Bezin et al. | 74/594.6 |
| 4,897,937 | 2/1990 | Misevich et al. | 36/43 |

FOREIGN PATENT DOCUMENTS

| | | |
|---|---|---|
| 2405037 | 6/1979 | France ................ 36/131 |
| 224624 | 11/1924 | United Kingdom . |
| 401979 | 11/1933 | United Kingdom . |
| 774742 | 5/1957 | United Kingdom . |
| 1405718 | 4/1973 | United Kingdom . |
| 2206030 | 12/1988 | United Kingdom . |
| 8902625 | 3/1989 | World Int. Prop. O. ...... 74/594.6 |

Primary Examiner—Paul T. Sewell
Assistant Examiner—Marie D. Patterson
Attorney, Agent, or Firm—Dickstein, Shapiro & Morin

[57] ABSTRACT

A cycling shoe having a cleat-attaching hole in its sole. The shoe has a pair of attaching holes for attaching a cleat to a sole of the shoe, the attaching holes being formed in the sole. The attaching holes are a pair of elongated slots formed substantially along a longitudinal direction of the shoe and are disposed substantially in parallel with each other along a lateral direction of the shoe. Each of the elongated slots can be alternately formed of a series of small holes aligned along the longitudinal direction of the shoe. A distance between the centers of the pair of elongated slots relative to the width of the shoe is limited at not greater than 19 mm so as to obtain a sufficient and necessary amount of cleat attachment angle range.

34 Claims, 7 Drawing Sheets

CYCLING SHOE

BACKGROUND OF THE INVENTION

1. Field of the Invention

The present invention relates to a cycling shoe, and more particularly to a cyclying shoe having a cleat-attaching hole in its sole.

2. Description of the Prior Art

A cycling shoe of the above-noted type is known from e.g. a Japanese laid-open patent gazette No. 64-22202. With this cycling shoe, there are formed, at different positions in its sole, three circular holes as the cleat-attaching holes.

One problem of this conventional construction is that the construction hardly allows adjustment of the attaching position of the cleat in the longitudinal direction of the shoe. The three-point attaching construction suffers another problem that predetermined clearance between each circular hole and a cleat-attaching bolt cannot alone permit angular adjustment of the cleat-attaching position.

In an attempt to overcome the above-problems, it is conceivable to form a pair of elongated attaching slots in the cleat rather than in the shoe sole, with the slots being aligned side by side substantially along the longitudinal axis of the shoe. However, since the positional relationship between the cleat and the attaching bolt or the like may vary depending on the adjustment of the attaching position, it becomes necessary to form another elongated slot at a longitudinal position displaced from those of the above-mentioned slot pair. Then, the formation of the three elongated slots necessarily leads to enlargement of the entire cleat per se and also to enlargement of the cleat-attaching area of the shoe sole. Further, such enlarged cleat-attaching area significantly limits the amount of position adjustment available. Moreover, the physically enlarged cleat, when attached to the shoe sole, will hamper a walking action of the user. Still further, this construction has not yet solved the problem of the narrow limit of attaching angle adjustment unless the number of the slots is increased even further.

SUMMARY OF THE INVENTION

The primary object of the present invention is to provide an improvement over the above-discussed conventional cycling shoe, the improvement permitting generous a amount of longitudinal position adjustment of the cleat-attaching position and also, an increased amount of attaching angle adjustment while minimizing deterioration in the strength of the shoe sole.

For accomplishing this object, a cycling shoe according to the present invention, comprises: a pair of attaching holes for attaching a cleat to a sole of the shoe, the attaching holes being formed in the sole; wherein the attaching holes are a pair of elongated slots formed substantially along a longitudinal direction of the shoe and are disposed substantially in parallel with each other along a lateral direction of the shoe. Each of the elongated slot can be alternately comprised of a series of small holes aligned along the longitudinal direction of the shoe.

With the above-described characterizing construction of the present invention, longitudinal adjustment of cleat-attaching position can be effected by using the elongated slots formed in the shoe sole. Accordingly, corresponding attaching holes of the cleat can be formed at fixed positions on the cleat without having to have longitudinal allowance for adjustment, and there occurs no change in attaching strength even when the cleat-attaching position is varied. Further, since the cleat has only two small holes along the lateral direction of the shoe, the cleat can be formed compact, which compactness allows greater freedom in the longitudinal position adjustment of the cleat relative to the shoe sole. Also, the compact cleat will not hamper walking action of the user.

Moreover, if the cleat has only two attaching holes as described above, the attaching bolt will move substantially along the elongated slot of the shoe sole with pivotal motion of the cleat relative to the shoe sole. Therefore, even with small radial clearance between the slot and the bolt, the attaching angle of the cleat relative to the shoe can be generously varied. Further, such small clearance makes it possible to minimize the width of the elongated slot, thus effectively restricting deterioration in the strength of the shoe sole.

Substantially the same effects as described above will be achieved by the aforementioned alternate arrangement using a series of small holes instead of each elongated slot. Moreover, this alternate arrangement has another advantage for further minimizing the width of the elongated slot thus more effectively restricting deterioration of the shoe sole strength.

Incidentally, the shorter the lateral distance between the elongated slots, the greater the freedom in the cleat attaching angle adjustment even with a very limited radial clearance between the slot and the attaching bolt. Then, according to one preferred embodiment of the present invention, the interdistance between the centers of the pair of elongated slots is limited at not more than 19 mm. With this arrangement, it becomes possible to obtain a sufficient and necessary amount of cleat attachment angle range while maintaining good sole strength by minimizing the width of the slots per se.

As described above, the present invention has achieved the intended object of providing the improvement in the cycling shoe which improvement permits generous a amount of longitudinal position adjustment of the cleat-attaching position and also an increased amount of attaching angle adjustment while minimizing deterioration in the strength of the shoe sole.

Also, in embodying the present invention, for preventing contact between the cleat attached to the slots and the ground, it is conceivable to provide a ground-contact member on the right and left sides of the elongated slots, with the ground-contact member projecting downwardly from the bottom face of the plate member.

Then, if this ground-contact member is comprised of an elastic element having a plurality of anti-slip projections and a reinforcing portion formed continously and integrally with the elastic element, with the reinforcing portion projecting less than the anti-slip projections yet having sufficient thickness in the longitudinal direction of the shoe, the reinforcing portion can advantageously prevent elastic deformation of the projections due to vertical load acting thereon. Further, this reinforcing portion is formed continous in the longitudinal direction of the shoe with the portion having sufficient thickness so as to prevent flexion of a part of the shoe sole corresponding to the ball of the user's foot and/or its periphery. Accordingly, the reinforcing portion acts also to assist the prevention of contact between the cleat and the ground. During a walking action too, the shoe portion around this cleat-attaching portion will not flex sharply, and the load acting on the cleat-attaching portion can be effectively dissipated to its periphery. Consequently, it has become possible to more effectively prevent damage of the cleat-attaching portion on the shoe shoe during a walking action and to more effectively prevent contact between the cleat and the ground.

Further and other objects, features and effects of the invention will become more apparent from the following more detailed description of the embodiments of the invention with reference to the accompanying drawings.

BRIEF DESCRIPTION OF THE DRAWINGS

Accompanying drawings FIGS. 1 through 8 illustrate one preferred embodiment of a cycling shoe relating to the present invention; in which, FIG. 1 is a bottom view of a shoe sole attached with a cleat, FIG. 2 is a view illustrating relationship between the cleat and elongated cleat-attaching slots formed in a sole of the shoe, FIG. 3 is a bottom view showing the entire shoe sole, FIG. 4 is a section view taken along a line 4—4 of FIG. 3, FIG. 5 is a section view of major portions, FIG. 6 is a section view illustrating engaging arrangement between the cleat and a pedal of a bicycle, FIG. 7 is an exploded perspective view of the cleat, FIG. 8 is a perspective view of the shoe, FIGS. 9 and 11 illustrate another embodiment of the present invention; in which, FIG. 9 is a view corresponding to FIG. 2, FIG. 11 is a view corresponding to FIG. 3.

DESCRIPTION OF THE PREFERRED EMBODIMENTS

Preferred embodiments of the present invention will now be described in particular with reference to the accompanying drawings.

Figure 8:
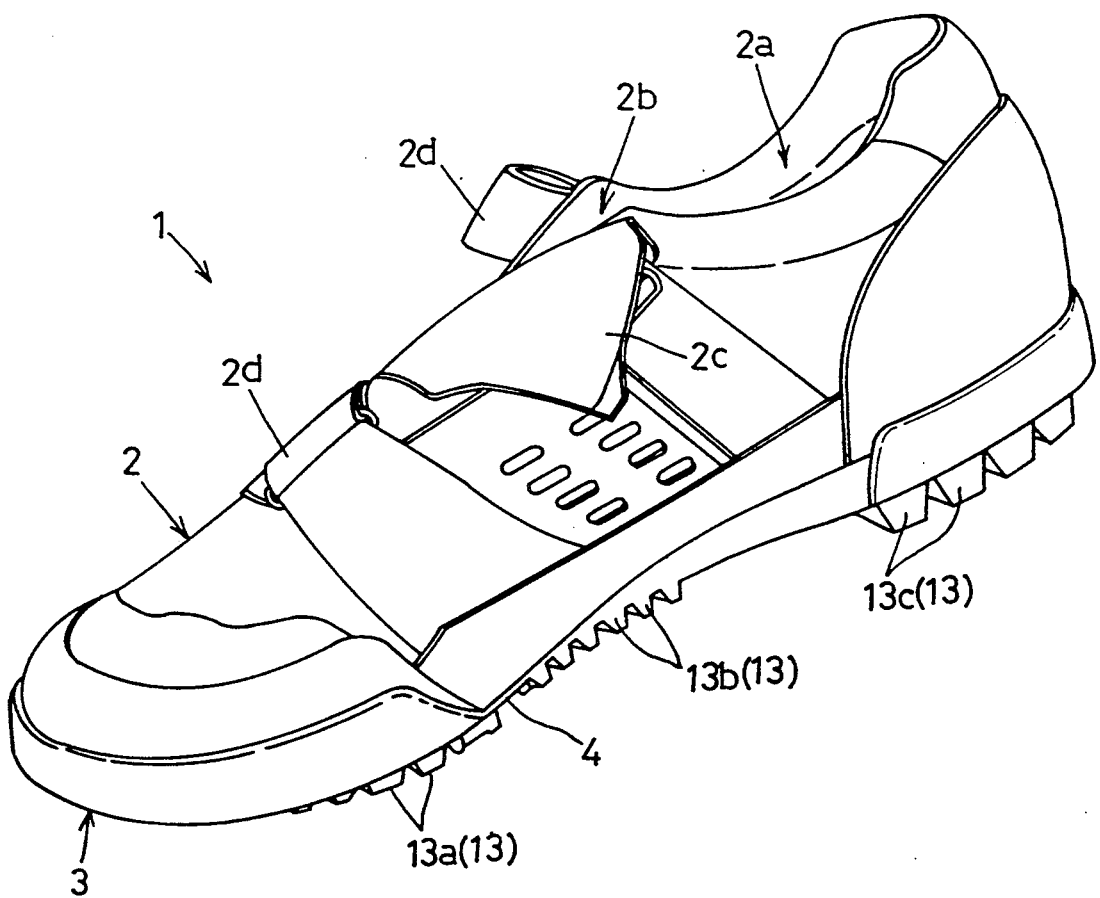

As shown in FIG. 8, a cycling shoe includes a peripheral portion 2 and a sole 3.

The peripheral portion 2 includes an inserting opening 2a through which a cyclist's foot is inserted, a cutout 2b provided at a position corresponding to an instep side of the cyclist's foot as being inserted in the opening 2a so as to provide the opening 2a with a longitudinal extension for facilitating the insertion of the foot into the opening 2a. The peripheral portion 2 further includes a tongue 2c for covering an upper region of the cutout 2b for preventing intrusion of sand or the like into the interior of the shoe and two fastener belts 2d with VELCRO (trademark) brand fastening means for fastening the instep side of the foot to the shoe by pressing the tongue 2c from the above.

Figure 5:
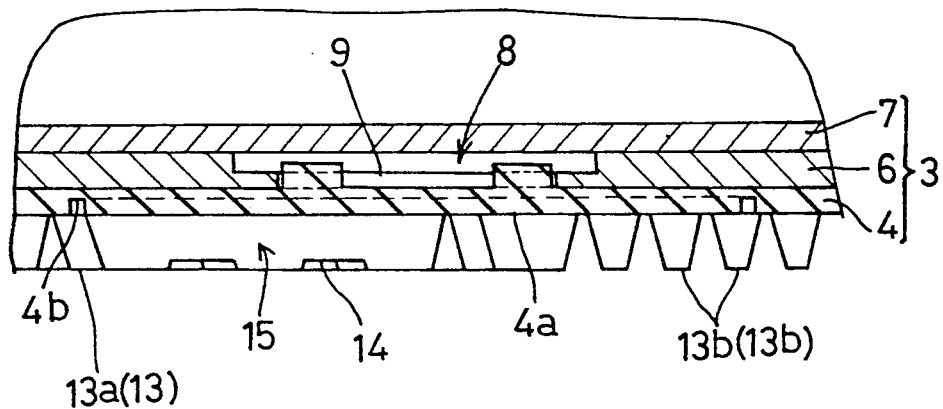
Figure 7:
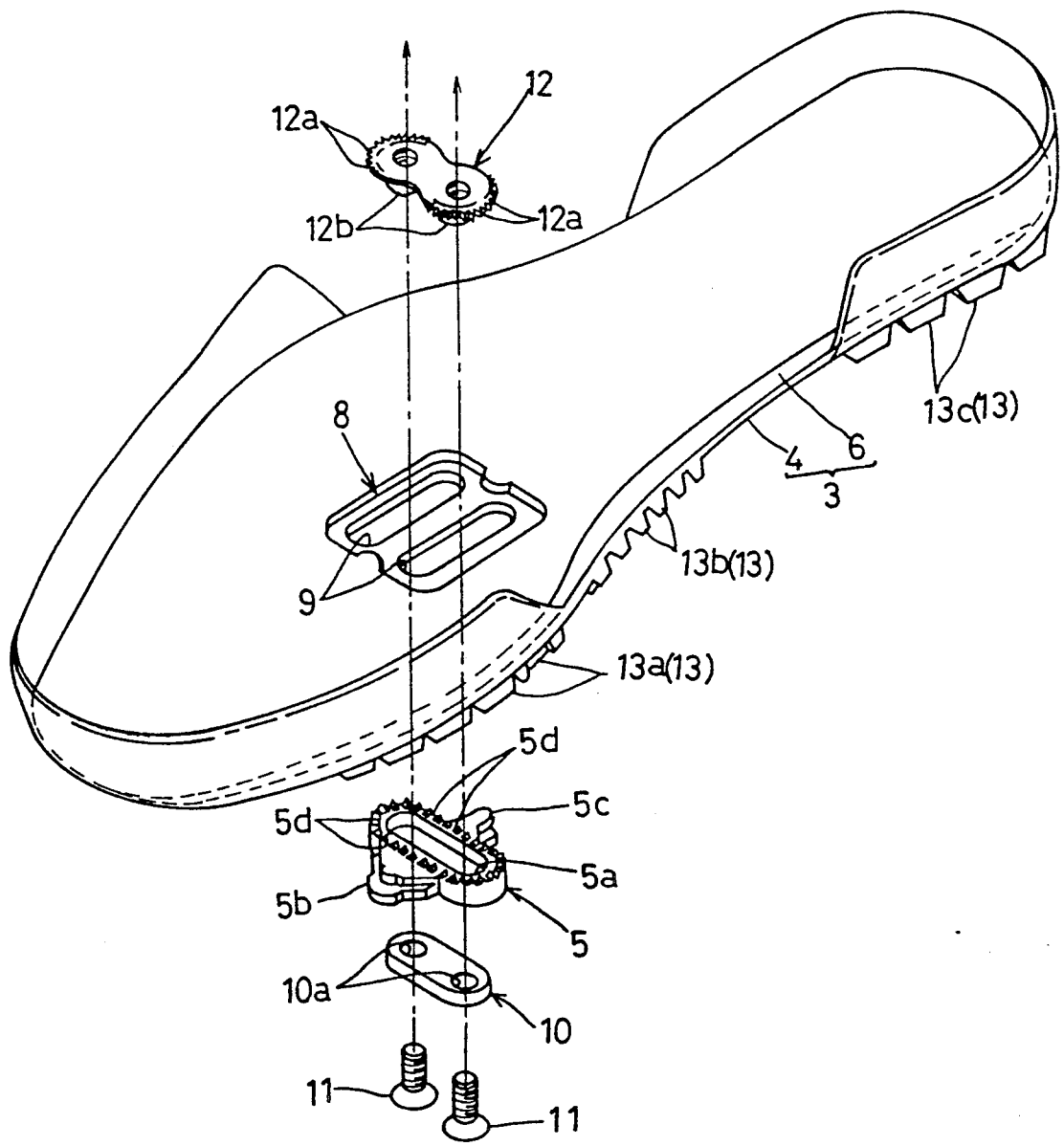

The sole 3, as shown in FIGS. 5 and 7, includes a bottom sole 4 made of elastic resin, a middle sole 6 made of hard resin and disposed over the bottom sole 4 for attaching a cleat 5 thereto, and an inner sole 7 disposed over the middle sole 6.

Figure 1:
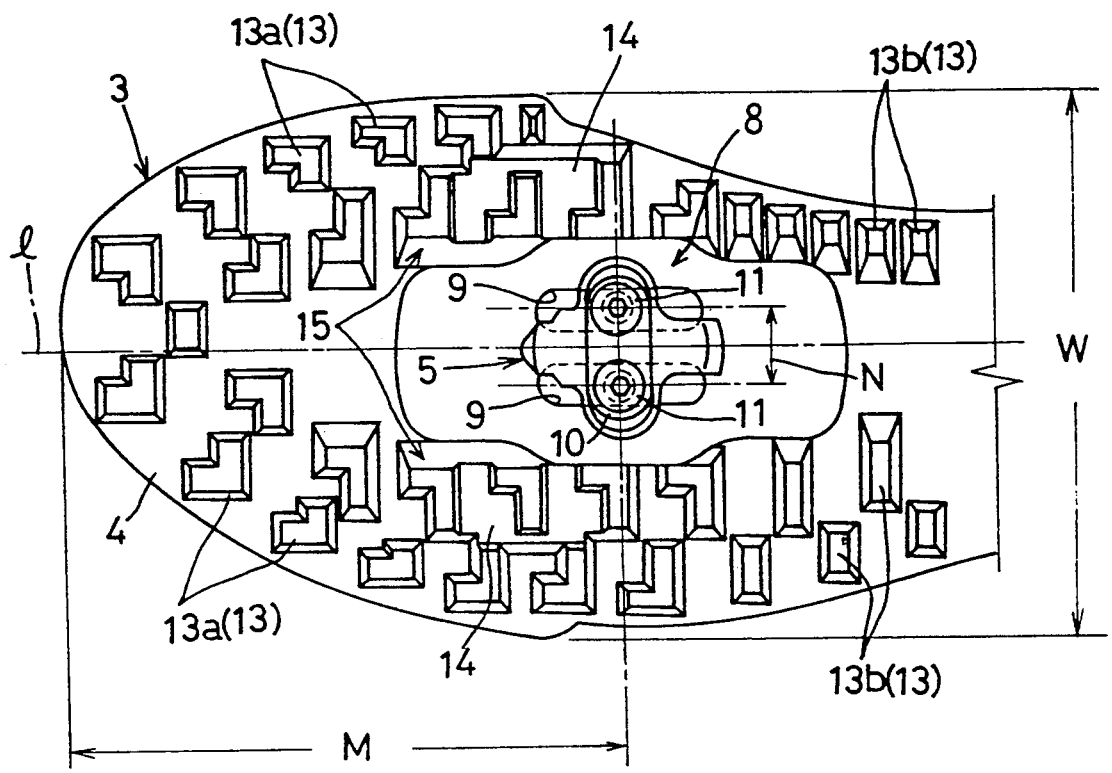
Figure 3:
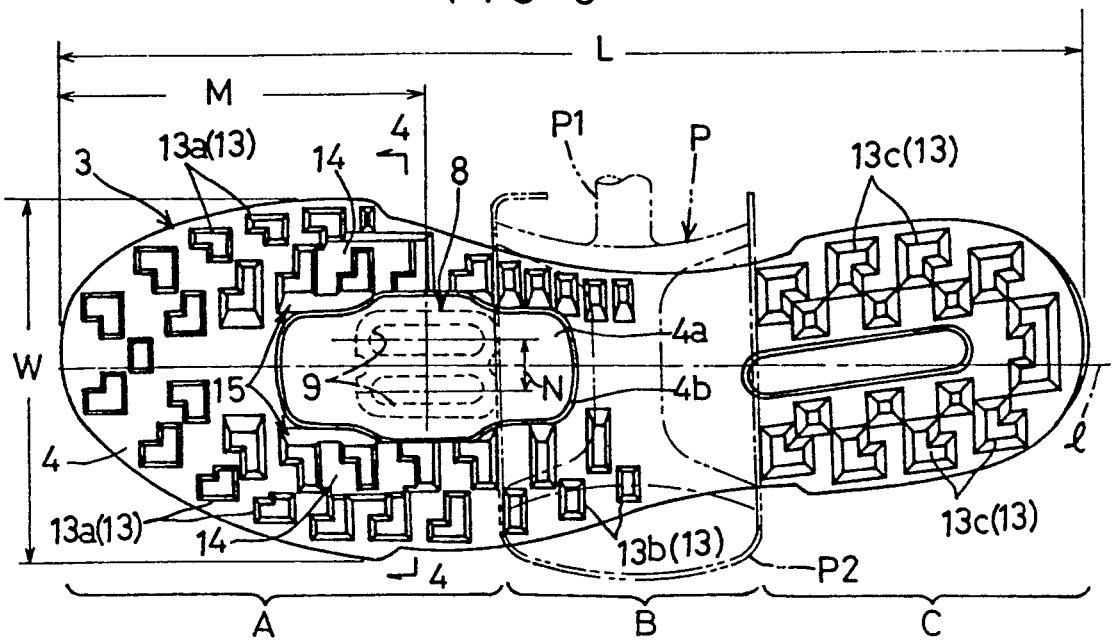
Figure 4:
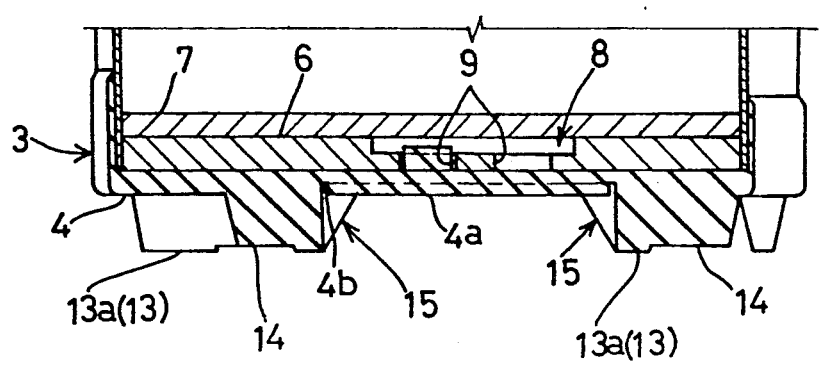
Figure 6:
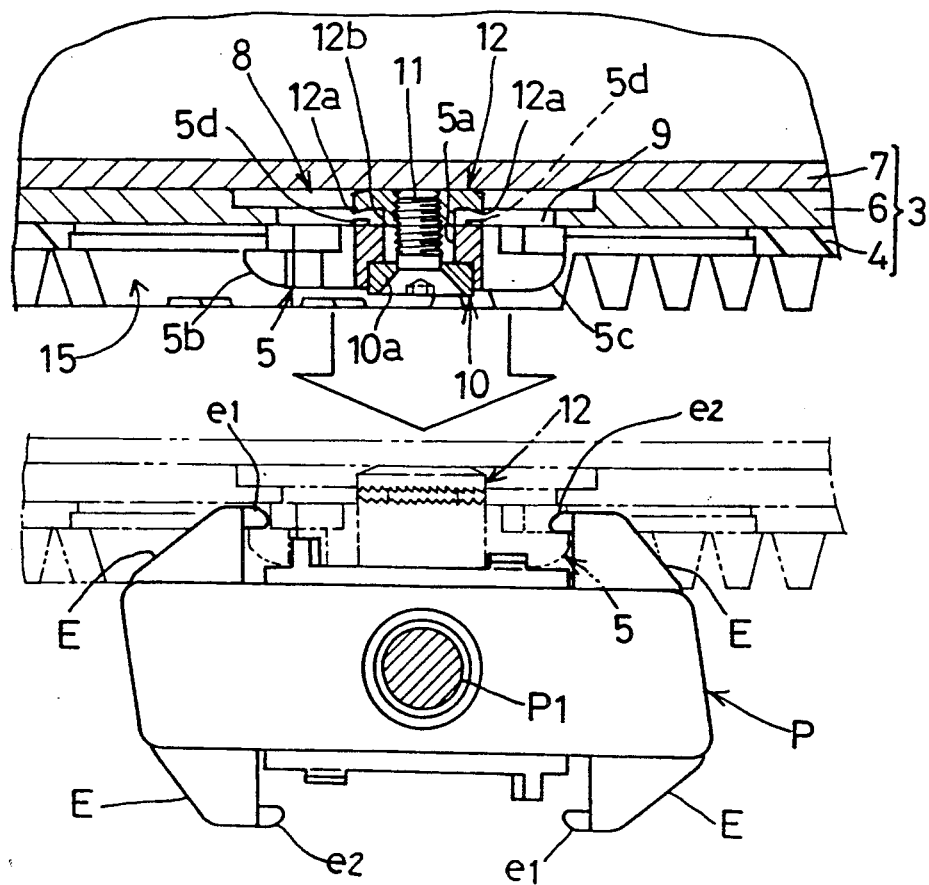

A portion of the bottom sole 4 corresponding to the ball of the rider's foot, except a cover portion 4a, is so constructed as to form a recessed, cleat-attaching area 8. More particularly, this recessed, cleat-attaching portion shown in FIGS. 1 and 6, is covered with the cover portion 4a formed integrally with and of the same material as the sole 4 as illustrated in FIGS. 3 through 5 immediately after the shoe 1 has been manufactured. Also, the cover portion 4a and the sole 4 are sectioned by a bordering recess portion 4b having a reduced thickness relative to the portion 4a and the sole 4. Then, for attachment of the cleat 5 to the sole 4, a cutting operation is carried out by applying a knife or the like along the bordering recess portion 4b to remove the cover portion 4a thus exposing the recessed, cleat-attaching area 8 to the ambience as illustrated in FIG. 1.

Figure 2:
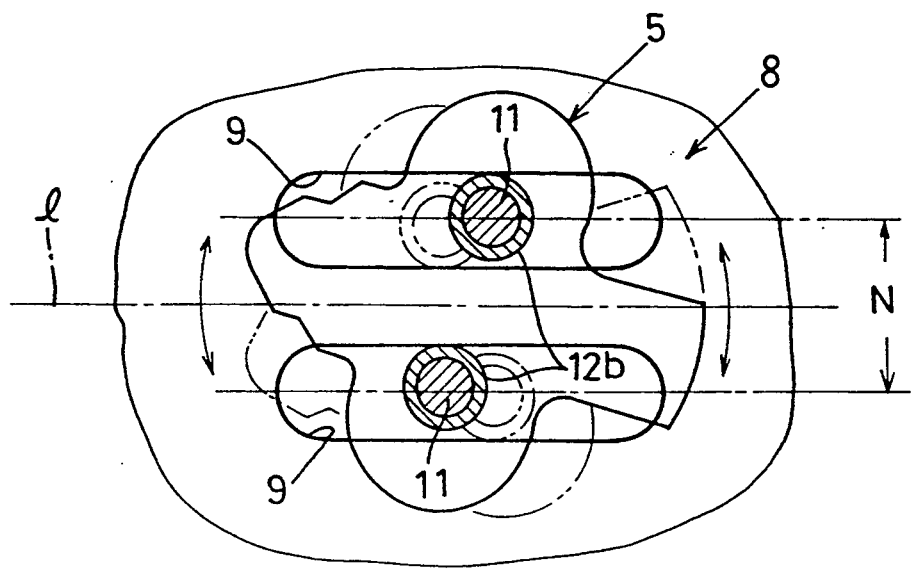

As shown in FIGS. 1 through 3, the middle sole 6 includes, as cleat-attaching portions, a pair of elongated slots 9, 9 extending along the longitudinal direction (l) of the shoe between the toe and the heel portions thereof. The elongated slots 9, 9 are disposed substantially in parallel with each other in the lateral direction of the shoe 1. Moreover, each elongated slot 9 has a width slightly greater than an outer diameter of a boss portion 12b of a nut 12 to be described in detail later. In an upper face of this middle sole 6 opposing to the cleat-attaching area 8, there is formed a concave portion for receiving the nut 12 therein so as to prevent the nut 12 from projecting into abutment against the sole of the cyclist's foot.

The cleat 5 to be attached to the cleat-attaching area 8, as shown in FIGS. 1, 6 and 7, is comprised of a cylindrical body having an elongated slot 5a at a center portion thereof and a pair of stopper projections 5b and 5c disposed at short-diameter sides of the slot 5a. Then, for attachment of this cleat 5, an elliptical base metal element 10 having a major axis shorter than the elongated slot 5a is fitted on the above-described cleat body; then, from the back face of the sole 3, a pair of attaching bolts 11, 11 are inserted through a pair of bolt inserting holes 10a, 10a formed in the base metal element 10 and also the elongated slots 9, 9 formed in the middle sole 6, so that the stopper projections 5b and 5c are aligned along the longitudinal direction of the shoe 1. Thereafter, the cleat body and the middle sole 6 are securely bolted with each other by means of a guitar-shaped nut 12.

A face of the cleat 5 which comes into contact with the middle sole 6, has a plurality of pointed projections 5d radially dispersed along the periphery of the cleat. Similarly, the nut 12 includes a plurality of projections dispersed along its periphery and the portion of the nut 12 forming these projections is slightly inclined towards the middle sole 6. Further, from a lower face of the nut 12, there are projected the boss portions 12b, 12b to be inserted into the elongated slots 9, 9, respectively. Then, as the bolts 11, 11 and the nut 12 are tightened with each other, the projections 5d and 12a are sunk into the middle sole 6 thus preventing linear sliding and pivoting displacements of the cleat 5 relative to the middle sole 6. Incidentally, the above-described attachment of the cleat 5 to the middle sole 6 is much superior in strength compared to attachment of the same to the bottom sole 4.

According to the above-described construction, after the bolts 11, 11 are loosened, then, as illustrated in FIG. 2, adjustment of cleat attaching position in the vertical direction can be effected by moving the entire cleat 5 along the elongated slots 9, 9 in the longitudinal direction of the shoe 1. Further, adjustment of cleat attaching position in the lateral direction can be effected by moving the entire cleat 5 relative to the base metal 10 in the sidewise direction of the shoe 1. Ideally, the attaching position of the cleat 5 should comprise a portion of the shoe sole slightly displaced towards the heel from the ball of the sole of the cyclist's foot. For this reason, as illustrated in FIGS. 1 and 3, a distance M from an extreme front end of the shoe 1 to a longitudinal common center of the elongated slots 9, 9 is set as 25 to 45% of an entire length L of the shoe 1, i.e. from its extreme front end to its extreme rear end.

Moreover, according to the above-described construction, after loosening the bolts 11, 11; then, as illustrated in FIG. 2, an attaching angle of the cleat 5 can be adjusted to a considerable degree by utilizing slight clearance provided between the elongated slots 9, 9 and the boss portions 12b, 12b. More particularly, since the bolts 11, 11 move substantially along the elongated slots 9, 9 with a pivotal movement of the cleat 5, a generous amount of attaching angle adjustment is possible even if the clearance between the slots 9, 9 and the boss portions 12b, 12b is formed relatively small. Further, with such small clearance, it becomes possible for each of the elongated slots 9, 9 to have a reduced width, thereby restraining deterioration in the strength of the shoe sole. Still further, the shorter the lateral distance between the elongated slots, the greater the freedom in the cleat attaching angle adjustment even with a very limited radial clearance. For this reason, as shown in FIGS. 1 and 3, the distance N between the centers of the elongated slots 9, 9 is set as being not greater than 19 mm, or preferably not greater than 18 mm. With such distance setting, another advantage will accrue. That is, it becomes possible to manufacture only one kind of the base metal element 10 and the nut 12 and to commonly use these for shoes of different sizes.

Some specific figures are provided below for determining the above-described dimensions. It is noted; however, that these figures should vary depending on the size of the entire shoe.

outer diameter of the boss portion 12b: about 6.8 mm
width of the elongated slot 9: about 7.4 mm
inter-center-distance N between the slots 9: about 14 mm
shoe width W adjacent the slots 9: about 108 mm As shown in FIGS. 1 and 3 through 5, on the bottom face of the bottom sole 4, there are formed an appropriate number of anti-slip projections 13 and also, there are formed a pair of right and left reinforcing portions 14 disposed on the right and left sides of the cleat-attaching area 8 for reinforcing a periphery of the same. These reinforcing portions 14 are formed integrally with and of the same material as the entire bottom sole 4 by e.g. the injection-molding method and extend continously in the longitudinal direction of the shoe along areas corresponding to the balls of the user's foot and/or their periphery which areas most significantly flex during a walking action, so that the reinforcing portions 14 may reinforce these areas against such flexion. Also, the shoe sole deforms only gradually relative to the peripheries of these reinforcing portions 14, there occurs no excessive load concentration at one point in the shoe sole.

That is, as described hereinbefore, the above arrangement can advantageously restrict strength deterioration of the cleat-attaching area 8 per se which results from the concave formation of this cleat-attaching area 8 by cutting away a part of the bottom sole 4 and from the formation of the slots 9, 9 in the middle sole 6. Further, since the cleat (does not flex during a walking action) is securely connected by means of the bolts 11, 11 and the nuts 12, it becomes possible to restrict the large load acting on the connections by rendering the portion of the sole 3 surrounding the connections less flexible.

The reinforcing portion 14 has also the projections 13 on its surface for restraining deterioration in the gripping force of the shoe sole, and the thickness of the reinforcing portion 14 is less than the projecting amount of the projections 13. Further, the projections 13 downwardly extend farther than the bottom face of the cleat 5 (the projections 13 and the reinforcing portions 14 correspond to the ground-contact member) so that the cleat 5 will not directly contact the ground surface when the cyclist walks with the cleat 5 attached to the cleat-attaching area 8. Incidentally, the clearance between the bottom face of the cleat 5 attached to the cleat-attaching area 8 and the bottom faces of the projections 13 around this cleat 5 should range between about 2 and 4 mm. In the instant embodiment, the thickness of the cleat 5 (including the base metal 10) relative to the vertical direction is set at about 6 mm.

The reinforcing portions 14 act also for preventing exessive deformation of the projections 13 around the reinforcing portions 14 due to the vertical load associated with the cyclist's walking action. Moreover, as described hereinbefore, since the reinforcing portions 14 can effectively restrict flexion of the shoe sole portion corresponding to the balls of the cyclist's foot and-/or periphery thereof, it becomes possible to effectively prevent, in particular, the forward area of the cleat 5 from projecting farther than the bottom shoe face to contact the ground surface.

Further, since the inter-center-distance N between the elongated slots 9, 9 is rendered short as described hereinbefore, the width of the cleat-attaching area 8 also can be formed short, thus increasing the width of the reinforcing portions 14, 14. Therefore, deterioration in the strength of the shoe sole can be further restrained.

In FIG. 6, a reference mark E denotes an engaging member which comes into engagement with the cleat 5 with the rider's stepping action on the pedal P so as to prevent erroneous detachment of the shoe 1 from the pedal P. More specifically, this engaging member E includes, at a leading end thereof, stopper claws e1 and e2 which come into engagement respectively with the stopper projections 5b and 5c of the cleat 5, and through this engagement erroneous detachment of the shoe 1 from the pedal P can be prevented. Further, in the above-described rider's pedal stepping action, for smoothly guiding the engaging member E to the cleat-attaching area 8, peripheral guide faces 15, 15 are formed along portions of the reinforcing portions 14 and those of the anti-slip projections 13 on the portions 14 facing the cleat-attaching area 8. Each guide face 15, as illustrated in FIG. 4, is so formed as to be gradually inclined towards the lateral side of the shoe 1 as the face 15 projects from the shoe sole. These guide faces 15 serve also to facilitate the aforementioned knife cutting operation to remove the cover portion 4a as the faces 15 allow substantially vertical positioning of the knife as being used for the cutting operation.

Further, the anti-slip projections 13, as illustrated in FIG. 3, are formed differently in a first region A at the leading end of the shoe 1, a second region B corresponding to the arch of the rider's foot and its vicinity and in a third region C corresponding to the heel of the rider's foot, respectively.

Some alternate embodiments will be specifically described next.

Figure 9:
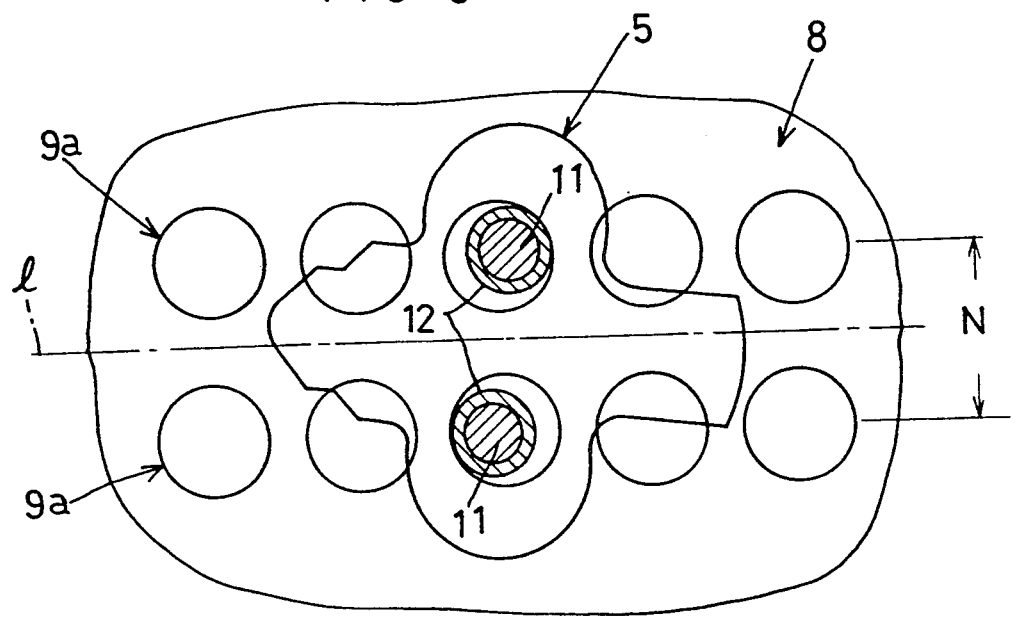

I. In the foregoing embodiment, the cleat-attaching portion includes a pair of elongated slots 9, 9. Instead, as illustrated in FIG. 9, the attaching portion may include a pair of parallel hole lines 9a aligned substantially along the longitudinal direction of the shoe. This alternate arrangment is advantageous for further improving the strength of the cleat-attaching holes.

Figure 10:
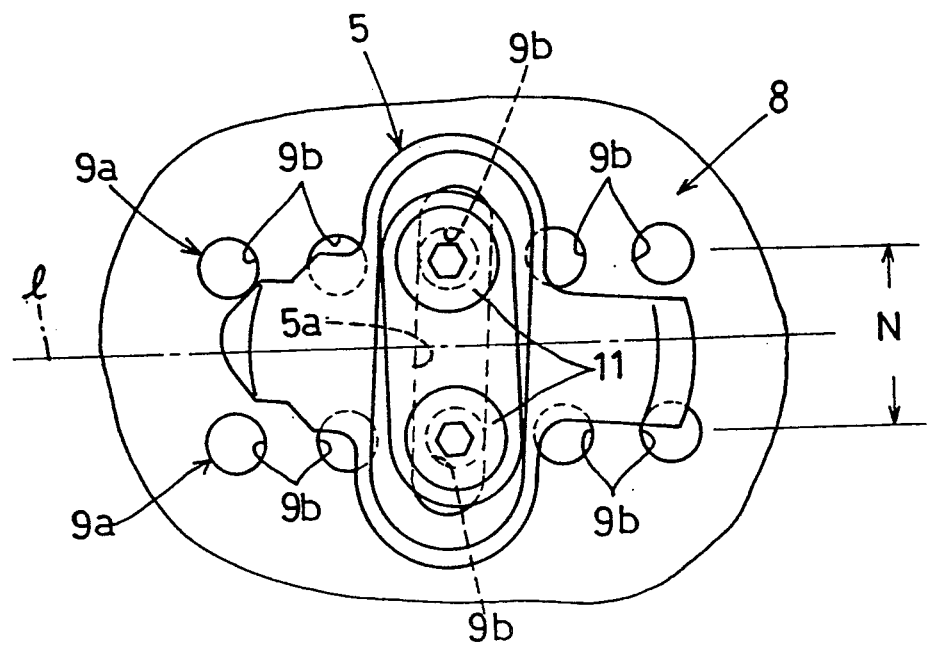
FIG. 10 is a view illustrating attachment angle adjustment utilizing clearance of the cleat.

Also, in place of the nut 12, as illustrated in FIG. 10, each of holes 9b together constituting the hole line 12a can be comprised of a screw hole, so that the cleat 5 is attached by the bolts 11, 11 and attaching angle can be adjusted by using clearance between the bolts 11, 11 and the through holes 5a of the cleat 5. In this case too, the attaching angle of the cleat 5 can vary to a greater degree than the three-point support construction of the prior art.

II. In the first embodiment, the reinforcing portions 14 and the sole 4 are formed integrally with each other by using the same material. Instead, the reinforcing portions 14 can be formed of a material different from that used for forming the sole 4.

III. In the first embodiment, the middle sole 6 is formed of hard resin material. Instead, the middle sole 6 can be formed of a leather material. Further, the cleat 5 can be formed of a hard resin rather than a metal. In this case, in the middle sole 6, the cleat-attaching area 8 will be formed of a metal and its face coming into contact with the cleat 5 will be formed with anti-displacement projections for the cleat 5.

Figure 11:
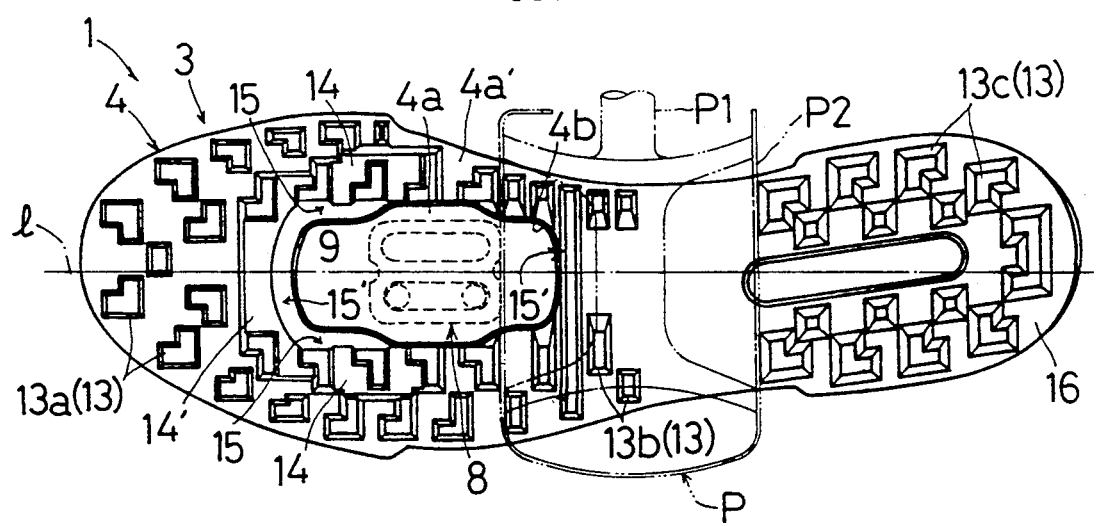

IV. In the foregoing embodiment, the reinforcing portions 14 are provided on the right and left sides of the cleat-attaching area 8. Instead, as shown in FIG. 11, it is also conceivable to provide a further thick reinforcing portions 14' on the forward and rear sides of the cleat-attaching area 8 and also to provide these reinforcing portion 14' with guide faces 15' respectively. With this arrangement, the guide faces 15' provided forwardly and rearwardly of the cleat-attaching area 8 can facilitate the longitudinal (relative to the shoe 1) positioning of the cleat 5 relative to the the pedal P as well.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A cycling shoe, comprising:
   an upper peripheral portion and a shoe sole connected to said upper peripheral portion, said shoe sole comprising an outer bottom sole and a separate middle sole overlying substantially the entirety of said outer bottom sole;
   a pair of attaching holes for attaching a cleat to said shoe, said holes being provided in said middle sole and being formed as a pair of elongated slots which extend entirely through said middle sole, said elongated slots being formed substantially along a longitudinal direction of said shoe, said elongated slots being substantially parallel to each other, and said slots being spaced apart from each other in lateral direction of said shoe.

2. A cycling shoe as defined in claim 1, wherein said shoe sole further comprises an inner sole overlying substantially the entirety of said middle sole.

3. A cycling shoe as defined in claim 2, wherein said outer bottom sole includes a plurality of spaced apart ground contacting projections, at least a portion of said projections extending longitudinally along said slots on the left and right sides of said slots, said portion of said projections having a predetermined depth from said middle sole such that when a cleat having a predetermined thickness which is less than said depth is mounted to said slots in said middle sole, said projections contact a ground surface to prevent the mounted cleat from contacting the ground surface.

4. A cycling shoe as defined in claim 3, wherein said ground contacting projections are provided at an area of said bottom sole corresponding at least to the ball of a cyclist's foot.

5. A cycling shoe as defined in claim 4, wherein said ground contacting projections are also provided on said bottom sole at least at a location forwardly of said slots.

6. A cycling shoe as defined in claim 5, wherein said bottom sole, including said ground contacting projections, is formed of an elastic element, said bottom sole further comprising a reinforcing portion provided on the left and right sides of said slots, said reinforcing portion being formed continuously and integrally with said elastic element, said reinforcing portion extending from said middle sole by an amount which is less than said predetermined depth.

7. A cycling shoe as defined in claim 3, wherein said bottom sole has an access hole therein which permits access to the slots provided in said middle sole from the exterior of said shoe.

8. A cycling shoe as defined in claim 7, wherein said access hole is exposable through a removable cover which overlies said middle sole.

9. A cycling shoe as defined in claim 8, wherein said removable cover is integrally formed with said bottom sole and is severable therefrom.

10. A cycling shoe as defined in claim 9, wherein a recess is provided in said bottom sole to define said removable cover, said removable cover being severable from said bottom sole along said recess.

11. A cycling shoe as defined in claim 7, wherein portions of said bottom sole adjacent at least left and right sides of said hole provide slanted guide faces for guiding portions of a bicycle pedal.

12. A cycling shoe as defined in claim 11, wherein said slanted guide faces are also provided by said bottom sole at a location forward of said slots.

13. A cycling shoe as defined in claim 2, wherein a distance between centers of said pair of elongated slots relative to the width-wise direction of said shoe is less than or equal to 19 mm.

14. A cycling shoe as defined in claim 13, wherein said middle sole is formed as a hard plate member, said middle sole further comprising a recess for receiving a nut used for cleat attachment, said recess being formed in an upper face of said hard plate member and having a lateral width slightly greater than a width of said elongated slots.

15. A cycling shoe usable with a cleat fixedly and detachably connectable to said shoe, comprising:
   an upper peripheral portion;
   a sole connected to said upper peripheral portion, said sole including: (1) a hard middle sole covering substantially the entirety of the sole of a cyclist's foot, and (2) an elastic outer bottom sole attached to a lower face of said middle sole;

a pair of attaching holes for attaching said cleat to said shoe, said holes being provided in said hard middle sole and being formed as a pair of elongated slots formed substantially along a longitudinal direction of said shoe, said elongated slots being substantially parallel to each other, and said slots being spaced apart from each other in a lateral direction of said shoe; and a ground-contact preventing member for preventing said cleat from contacting the ground, said preventing member being formed integrally with said outer bottom sole and comprising a projecting portion for preventing said cleat, as attached to said slots, from coming into contact with the ground, said ground-contact preventing member being formed on the right and left sides of said slots.

16. A cycling shoe as defined in claim 15, wherein said outer bottom sole surrounds said slots in a continuous manner.

17. A cycling shoe as defined in claim 16, wherein said ground-contact preventing member is provided along substantially the entire lengths of said slots.

18. A cycling shoe as defined in claim 17, wherein said outer bottom sole includes a plurality of spaced apart ground-contacting projections and a reinforcing portion having an increased thickness and provided on the right and left sides of said slots.

19. A cycling shoe as defined in claim 18, wherein said shoe further comprises a recess for receiving a nut used for cleat attachment, said recess being formed in an upper face of said middle sole and having a lateral width slightly greater than a width of said elongated slots.

20. A cycling shoe as define in claim 18, wherein said ground-contact preventing member is provided at an area corresponding to the ball of the cyclist's foot, said reinforcing portion having a depth which is less than the depth of said ground-contact projections, said reinforcing portion being continuously formed in the longitudinal direction of said shoe.

21. A cycling shoe as defined in claim 18, wherein said ground-contact preventing member is further provided forwardly of said slots.

22. A cycling shoe as defined in claim 21, wherein said outer bottom sole is further provided at a heel portion of said shoe.

23. A cycling shoe usable with a cleat fixedly and detachably connectable to the shoe, comprising:
an upper peripheral portion;
a sole connected to said upper peripheral portion, said sole including: (1) a hard middle sole covering substantially the entirety of the sole of a cyclist's foot, and (2) an elastic outer bottom sole attached to a lower face of said middle sole;
a pair of attaching holes for attaching said cleat to said shoe, said holes being provided in said hard middle sole and being formed as a pair of elongated slots formed substantially along a longitudinal direction of said shoe, said elongated slots being substantially parallel to each other, and said slots being spaced apart from each other in a lateral direction of said shoe;
a cleat protecting member formed integrally with said outer bottom sole, said protecting member comprising a projecting portion for protecting said cleat, as attached to said slots, said cleat protecting member being provided on the right and left sides of said slots; and a slanted guide face for guiding a portion of a bicycle pedal, said guide face being formed in said protecting member adjacent said slots.

24. A cycling shoe as defined in claim 23, wherein said outer bottom sole includes a plurality of spaced apart ground-contacting projections and a reinforcing portion having an increased thickness and provided on the right and left sides of said slots.

25. A cycling shoe as defined in claim 24, wherein said cleat protecting member is provided at an area corresponding to the ball of the cyclist's foot, said reinforcing portion having a depth which is less than the depth of said ground-contact projections, said reinforcing portion being continuously formed in the longitudinal direction of said shoe.

26. A cycling shoe as defined in claim 24, wherein said cleat protecting member and said slanted guide face are further provided forwardly of said slots.

27. A cycling shoe as defined in claim 26, wherein said outer bottom sole is further provided at a heel portion of said shoe.

28. A cycling shoe usable with a cleat fixedly and detachably connectable to said shoe, comprising:
an upper peripheral portion;
a sole connected to said upper peripheral portion, said sole including: (1) a hard middle sole covering substantially the entirety of the sole of a cyclist's foot, and (2) an elastic outer bottom sole attached to a lower face of said middle sole;
a pair of attaching holes for attaching said cleat to said shoe, said holes being provided in said hard middle sole and being formed as a pair of elongated slots formed substantially along a longitudinal direction of said shoe, said elongated slots being substantially parallel to each other, and said slots being spaced apart from each other in a lateral direction of said shoe, and wherein the distance between said slots in 19 mm or less;
said outer bottom sole being provided at forward and heel portions of said shoe and including a plurality of spaced apart ground-contacting projections.

29. A cycling shoe as defined in claim 28, wherein the distance between said slots is 14 mm to 19 mm.

30. A cycling shoe as defined in claim 29, further comprising a ground-contact preventing member for preventing said cleat from contacting the ground, said preventing member being formed integrally with said outer bottom sole and comprising a projecting portion for preventing said cleat, as attached to said slots, from coming into contact with the ground, said ground-contact preventing member being formed on the right and left sides of said slots.

31. A cycling shoe as defined in claim 28, wherein said pair of slots form therebetween a rib having a width not less than 6.6 mm.

32. A cycling shoe as defined in claim 31, further comprising a ground-contact preventing member for preventing said cleat from contacting the ground, said preventing member being formed integrally with said outer bottom sole and comprising a projecting portion for preventing said cleat, as attached to said slots, from coming into contact with the ground, said ground-contact preventing member member being formed on the right and left sides of said slots.

33. A cycling shoe usable with a cleat fixedly and detachably connectable to said shoe, comprising:
an upper peripheral portion;

a sole connected to said upper peripheral portion, said sole including: (1) a hard middle sole covering substantially the entirety of the sole of a cyclist's foot, and (2) an elastic outer bottom sole attached to a lower face of said middle sole;

a pair of attaching holes for attaching said cleat to said shoe, said holes being provided in said hard middle sole and being formed as a pair of elongated slots formed substantially along a longitudinal direction of said shoe, said elongated slots being substantially parallel to each other, and said slots being spaced apart from each other in a lateral direction of said shoe;

a ground-contact preventing member for preventing said cleat from contacting the ground, said preventing member being formed integrally with said outer bottom sole and comprising a projecting portion for preventing said cleat, as attached to said slots, from coming into contact with the ground, said ground-contact preventing member being formed along at least one of the sides of said slots and along substantially the entire length of said slots;

wherein said outer bottom sole has an integrally formed heel portion, and wherein said outer bottom sole surrounds said slots in a continuous manner.

34. A cycling shoe as defined in claim 33, wherein said ground-contact preventing member is further provided forwardly of said slots.

* * * * *